(12) United States Patent
Moroga et al.

(10) Patent No.: US 11,012,280 B2
(45) Date of Patent: May 18, 2021

(54) USER TERMINAL AND RADIO COMMUNICATION METHOD

(71) Applicant: NTT DOCOMO, INC., Tokyo (JP)

(72) Inventors: Hideyuki Moroga, Tokyo (JP); Kazuaki Takeda, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/483,199

(22) PCT Filed: Jan. 31, 2018

(86) PCT No.: PCT/JP2018/003222
§ 371 (c)(1),
(2) Date: Aug. 2, 2019

(87) PCT Pub. No.: WO2018/143275
PCT Pub. Date: Aug. 9, 2018

(65) Prior Publication Data
US 2019/0372813 A1  Dec. 5, 2019

(30) Foreign Application Priority Data
Feb. 3, 2017 (JP) .............................. JP2017-019121

(51) Int. Cl.
*H04L 27/26* (2006.01)
*H04L 5/00* (2006.01)

(52) U.S. Cl.
CPC .......... *H04L 27/265* (2013.01); *H04L 5/0044* (2013.01); *H04L 27/2636* (2013.01)

(58) Field of Classification Search
CPC ............... H04L 27/265; H04L 27/2636; H04L 27/2634; H04L 27/2642; H04L 5/0044; H04L 5/0046; H04L 5/0048
See application file for complete search history.

(56) References Cited

U.S. PATENT DOCUMENTS

2015/0256308 A1*  9/2015  Ma ..................... H04W 72/042
                                                    370/330
2016/0380689 A1* 12/2016  Sun ....................... H04L 1/206
                                                    370/330
(Continued)

OTHER PUBLICATIONS

3GPP TS 36.300 v13.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Jun. 2016 (310 pages).
(Continued)

*Primary Examiner* — Candal Elpenord
(74) *Attorney, Agent, or Firm* — Osha Bergman Watanabe & Burton LLP

(57) ABSTRACT

In user terminal 20, control section 202 determines signal waveforms according to a signal-waveform switching pattern notified by control section 102 of base station 10, and indicates the signal waveforms to preprocessing section 205, signal detection section 207, and post-processing section 208 for each TTI. Configuration IDs are assigned to respective signal-waveform switching patterns, and signal waveforms that are to be transmitted in TTIs and that are specified by the TTI index are configured for each of the Configuration IDs. With this configuration, a plurality of signal waveforms whose symbol lengths are different from one signal waveform to another are used together while no symbol spans two adjacent TTIs.

3 Claims, 13 Drawing Sheets

(56) References Cited

U.S. PATENT DOCUMENTS

| | | | | |
|---|---|---|---|---|
| 2018/0006706 A1* | 1/2018 | Cheng | ............... | H04W 72/042 |
| 2019/0081672 A1* | 3/2019 | Hwang | ............... | H04B 7/0413 |
| 2019/0229861 A1* | 7/2019 | Yoshimura | ........... | H04L 5/0042 |
| 2019/0238385 A1* | 8/2019 | Yang | .................. | H04W 72/042 |
| 2020/0036470 A1* | 1/2020 | Olesen | ................ | H04L 1/0025 |
| 2020/0296749 A1* | 9/2020 | Freda | ............... | H04W 28/0268 |

OTHER PUBLICATIONS

Mitsubishi Electric, Considerations on numerology for support of flexible guard lengths, 3GPP TSG-RAN WG1#86 R1-166225, Aug. 26, 2016 (4 pages).

Nokia, et al., OFDM based Waveform for 5G new radio interface, 3GPP TSG-RAN WG1#84bis R1-162889, Apr. 15, 2016 (3 pages).

InterDigital Communications, Design considerations on waveform in UL for New Radio Systems, 3GPP TSG-RAN WG1#84bis R1-162925, Apr. 15, 2015 (6 pages).

International Search Report issued in corresponding International Application No. PCT/JP2018/003222; dated Mar. 13, 2018 (4 pages).

Written Opinion of the International Searching Authority issued in corresponding International Application No. PCT/JP2018/003222; dated Mar. 13, 2018 (3 pages).

* cited by examiner

| Configuration ID | TTI index | | | | | | | | | |
|---|---|---|---|---|---|---|---|---|---|---|
| | 0 | 1 | 2 | 3 | 4 | 5 | 6 | 7 | 8 | 9 |
| #0 | O/D | O/D | O/D | O/D | O/D | U | U | U | U | U |
| #1 | O/D | U | O/D | U | O/D | U | O/D | U | O/D | U |
| #2 | O/D | O/D | O/D | U | U | U | U | U | U | U |
| #3 | U | U | U | O/D | O/D | O/D | O/D | O/D | O/D | O/D |

O/D···OFDM or DFT-s-OFDM
U···UW-DFT-s-OFDM

FIG. 3

| configuration | DFT-s-OFDM SUBCARRIER SPACING (kHz) | DFT-s-OFDM SYMBOL LENGTH (μs) | NUMBER OF DFT-s-OFDM SYMBOLS | UW DFT-s-OFDM SUBCARRIER SPACING (kHz) | UW-DFT-s-OFDM SYMBOL LENGTH (μs) | NUMBER OF UW-DFT-s-OFDM SYMBOLS | TOTAL TRANSMISSION TIME (μs) |
|---|---|---|---|---|---|---|---|
| #0 | 15 | 71.4 | 7 | 30 | 33.3 | 15 | 1000 |
| #1 | 15 | 71.4 | 7 | 60 | 16.7 | 30 | 1000 |
| #2 | 30 | 35.7 | 7 | 60 | 16.7 | 45 | 1000 |
| #3 | 30 | 35.7 | 14 | 60 | 16.7 | 30 | 1000 |
| #4 | 30 | 35.7 | 21 | 60 | 16.7 | 15 | 1000 |

FIG. 8

USER TERMINAL AND RADIO COMMUNICATION METHOD

TECHNICAL FIELD

The present invention relates to a user terminal and a radio communication method in a next-generation mobile communication system.

BACKGROUND ART

Long Term Evolution (LTE) has been specified for achieving a higher data rate, lower latency, and the like in a UMTS (Universal Mobile Telecommunications System) network, (see Non-Patent Literature (hereinafter referred to as "NPL") 1). Successor systems of LTE have also been studied for achieving a broader bandwidth and a higher speed based on LTE. Examples of successor systems of LTE include the systems called LTE-Advanced (LTE-A), Future Radio Access (FRA), 5th generation mobile communication system (5G), 5G plus (5G+), New Radio Access Technology (New-RAT)), and the like.

Utilizing a high frequency band of 40 GHz or higher as a radio frequency has been studied for the future radio communication system. Utilizing, as transmission waveforms in the downlink in high frequency bands, Orthogonal Frequency Division Multiplexing (OFDM); DFT spread OFDM (DFT-s-OFDM) that achieves signal waveform generation by spreading based on Discrete Fourier Transform (DFT); Unique Word DFT spread OFDM (UW-DFT-s-OFDM) in which a Unique Word (UW) is put to the beginning/end of data; and the like has also been studied for the future radio communication system. In this case, low PAPR can be achieved by utilizing a single carrier, DFT-s-OFDM, or UW-DFT-d-OFDM.

OFDM or DFT-s-OFDM symbol length and UW-DFT-s-OFDM symbol length are different from each other. For example, one OFDM or DFT-s-OFDM symbol length is 71.4 µs (data length: 66.7 µs+CP length: 4.7 µs) and one UW-DFT-s-OFDM symbol length is 66.7 µs when it is assumed that subcarrier spacing is 15 kHz and the length of a Cyclic Prefix (CP) in OFDM or DFT-s-OFDM is approximately the same as that of a CP in LTE.

Moreover, it is considered that a plurality of CP lengths in OFDM or DFT-s-OFDM are defined and a plurality of signal waveforms whose symbol lengths are different from one signal waveform to another are defined in order to efficiently support users whose requirements are different from one another.

CITATION LIST

Non-Patent Literature

NPL 1
3GPP TS 36.300 v13.4.0, "Evolved Universal Terrestrial Radio Access (E-UTRA) and Evolved Universal Terrestrial Radio Access Network (E-UTRAN); Overall description; Stage 2 (Release 13)," June 2016

SUMMARY OF INVENTION

Technical Problem

At present, in 5G no technique directed to a method for transmitting in the downlink, in which a plurality of signal waveforms whose symbol lengths are different from one signal waveform to another are used together has been disclosed.

When a plurality of signal waveforms whose symbol lengths are different from one signal waveform to another are mapped within a Transmission Time Interval (TTI), which is the minimum time unit of scheduling, there is a risk that one symbol spans beyond the TTI.

In one aspect of the present invention, a new configuration which makes it possible to use together a plurality of signal waveforms whose symbol lengths are different from one signal waveform to another in downlink transmission in the future radio communication system without causing any symbol to span two adjacent TTIs is provided.

Solution to Problem

A user terminal according to one aspect of the present invention includes: a control section configured to determine a signal waveform of a symbol of a downlink signal; a reception section configured to receive the downlink signal; a preprocessing section configured to preprocess the received downlink signal based on the determined signal waveform; an FFT section configured to perform FFT processing on the preprocessed signal; and a signal detection section configured to perform, based on the determined signal waveform, equalization processing on the signal subjected to the FFT processing. In the user terminal, the signal waveform is selected from among a plurality of signal-waveform candidates whose symbol lengths differ from one signal-waveform candidate to another, and the signal waveform is mapped in a TTI while the symbol does not span beyond the TTI.

A radio communication method according to one aspect of the present invention includes: determining a signal waveform of a symbol of a downlink signal; receiving the downlink signal; preprocessing the received downlink signal based on the determined signal waveform; performing FFT processing on the preprocessed signal; and performing, based on the determined signal waveform, equalization processing on the signal subjected to the FFT processing. In the radio communication method, the signal waveform is selected from among a plurality of signal-waveform candidates whose symbol lengths differ from one signal-waveform candidate to another, and the signal waveform is mapped in a TTI while the symbol does not span beyond the TTI.

Advantageous Effects of Invention

According to one aspect of the present invention, a new configuration which makes it possible to use together a plurality of signal waveforms whose symbol lengths are different from one signal waveform to another in downlink transmission in the future radio communication system without causing any symbol to span two adjacent TTIs is provided.

BRIEF DESCRIPTION OF DRAWINGS

FIG. 3 illustrates an example of a signal-waveform switching pattern stored in the radio base station according to Embodiment 1;

FIG. 8 illustrates exemplary combination patterns of subcarrier spacing and the numbers of symbols of signal waveforms as stored in a radio base station according to Embodiment 3;

DESCRIPTION OF EMBODIMENTS

Hereinafter, embodiments of the present invention will be described with reference to the accompanying drawings. Note that, the following embodiments will be described in relation to cases where DFT-s-OFDM and UW-DFT-s-OFDM are used together.

Embodiment 1

A radio communication system according to Embodiment 1 includes at least radio base station (hereinafter referred to as "base station") 10 illustrated in FIG. 1 and user terminal (hereinafter referred to as "terminal") 20 illustrated in FIG. 2. Terminal 20 is connected to base station 10. Base station 10 transmits a DL (Down Link) signal to terminal 20. The DL signal includes a DL data signal (for example, Physical Downlink Shared Channel (PDSCH)) and a DL control signal (for example, Physical Downlink Control Channel (PDCCH)) used for demodulating and decoding the DL data signal, for example.

<Radio Base Station>

Figure 1:
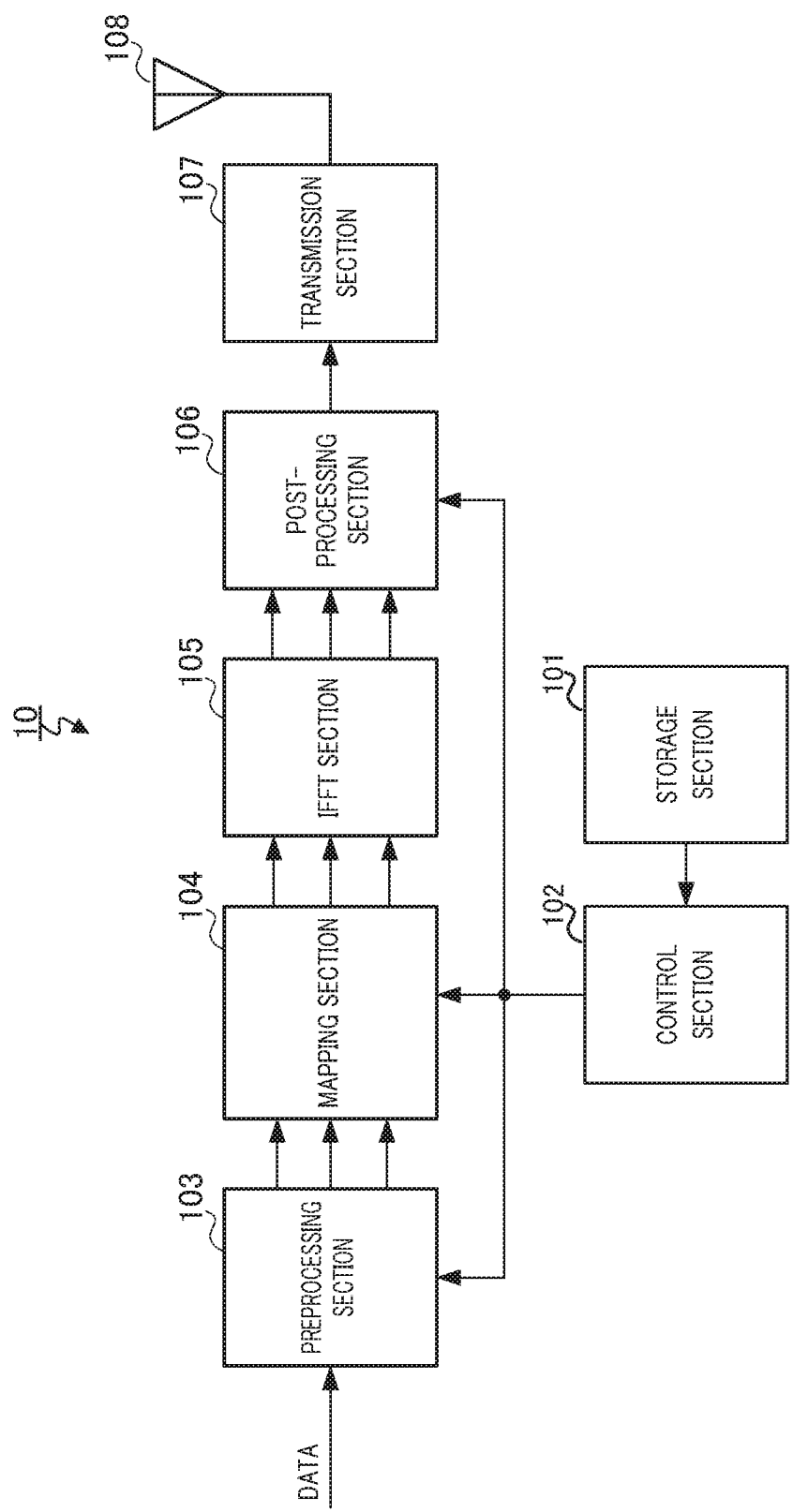
FIG. 1 is a block diagram illustrating an exemplary configuration of a radio base station according to Embodiment 1.

FIG. 1 is a block diagram illustrating an exemplary configuration of base station 10 according to Embodiment 1. Base station 10 illustrated in FIG. 1 includes storage section 101, control section 102, preprocessing section 103, mapping section 104, IFFT section 105, post-processing section 106, transmission section 107, and antenna 108.

Storage section 101 stores signal-waveform switching patterns indicating signal waveforms to be transmitted in TTIs.

Control section 102 determines one or more signal waveforms for the TTIs according to one of the signal-waveform switching patterns stored in storage section 101, and indicates the one or more signal waveforms to preprocessing section 103, mapping section 104, and post-processing section 106. Note that, the details of operations by control section 102 are described below together with illustration of the signal-waveform switching patterns.

In addition, base station 10 (control section 102) notifies terminal 20 (control section 202) of information indicating a selected signal-waveform switching pattern. A concrete example of the notification method is described below.

Preprocessing section 103 preprocesses input data (modulated symbol sequence) according to the one or more signal waveforms indicated by control section 102, and outputs the preprocessed signal to mapping section 104. When DFT-s-OFDM is indicated, for example, preprocessing section 103 generates a time domain signal by performing serial-to-parallel conversion of the data, further applies the discrete Fourier transform to the data, and outputs an obtained frequency domain signal to mapping section 104. In addition, when UF-DFT-s-OFDM is indicated, preprocessing section 103 generates a time domain signal by performing serial-to-parallel conversion of the data and then putting a UW to both ends of the data, further applies the discrete Fourier transform to the data, and outputs an obtained frequency domain signal to mapping section 104. Note that, positions to which the UW is put may be other than both ends, and may, for example, be only the start or end of the data. The UW may also be put to multiple positions including the middle.

Mapping section 104 maps, to a resource (subcarriers, symbols) corresponding to the one or more signal waveforms indicated by control section 102, the frequency domain signal output from the preprocessing section 103. Mapping section 104 also maps 0 to subcarriers other than the subcarriers to which the frequency domain signal is mapped. Mapping section 104 then outputs the mapped frequency domain signal to IFFT section 105.

IFFT section 105 performs the inverse fast Fourier transform on the frequency domain signal output from mapping section 104, and outputs the obtained time domain signal to post-processing section 106.

Post-processing section 106 performs post-processing on the time domain signal output from IFFT section 105 according to the one or more signal waveforms indicated by control section 102, and outputs the post-processed signal to transmission section 107. For example, when DFT-s-OFDM is indicated, post-processing section 106 puts a CP to the time domain signal output from IFFT section 105, performs parallel-to-serial conversion of the time domain signal, and outputs the resultant signal to transmission section 107. When UW-DFT-s-OFDM is indicated, post-processing section 106 performs parallel-to-serial conversion of the time domain signal output from IFFT section 105, and outputs the resultant signal to transmission section 107.

Transmission section 107 performs Radio Frequency (RF) processing, such as Digital-to-Analog (D/A) conversion, upconversion, amplification, and the like on the time domain signal (DL signal) output from post-processing section 106, and transmits a radio signal to terminal 20 via antenna 108.

<User Terminal>

Figure 2:
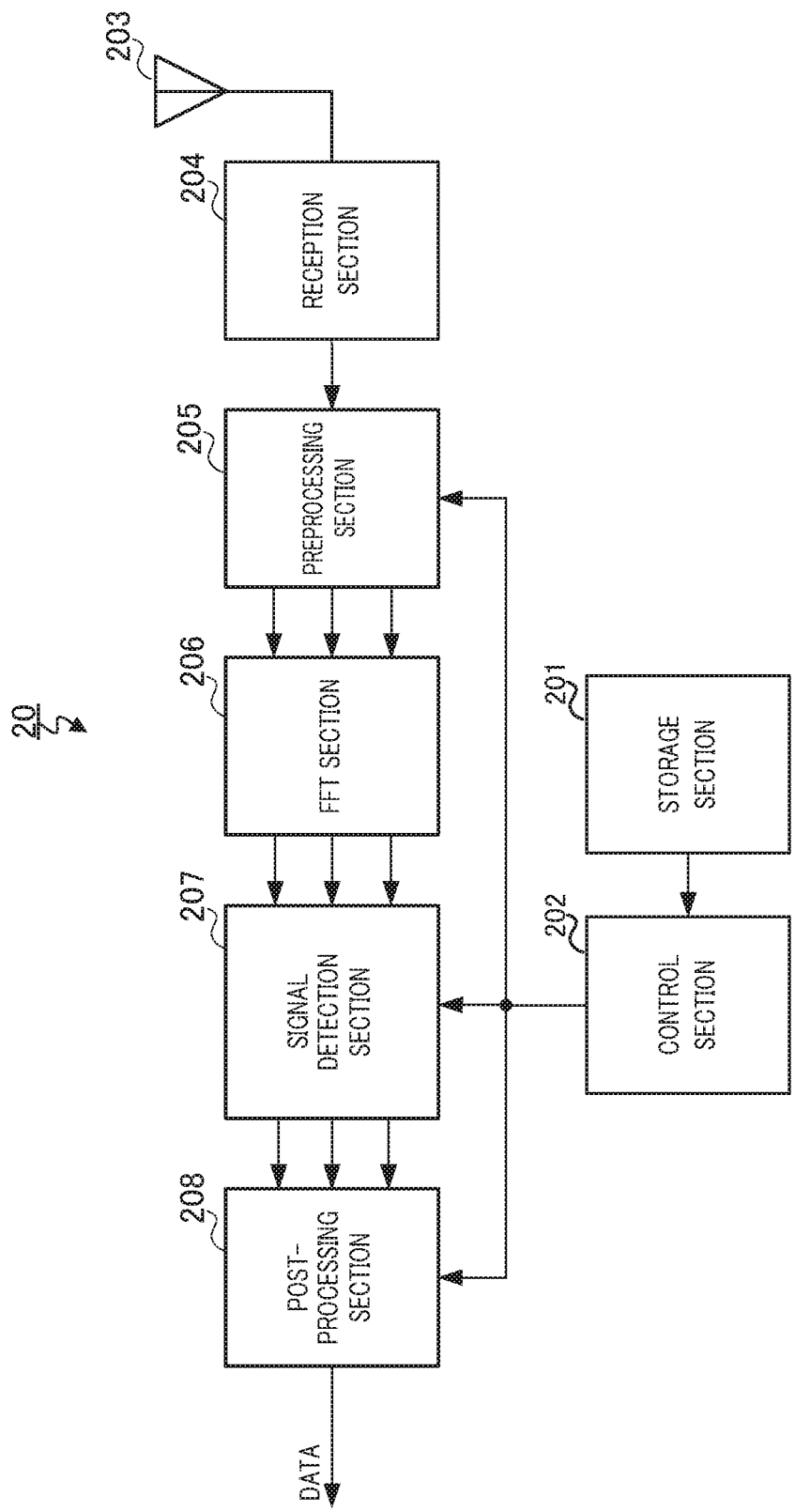
FIG. 2 is a block diagram illustrating an exemplary configuration of a user terminal according to Embodiment 1.

FIG. 2 is a block diagram illustrating an exemplary configuration of terminal 20 according to Embodiment 1. Terminal 20 illustrated in FIG. 2 includes storage section 201, control section 202, antenna 203, reception section 204, preprocessing section 205, FFT section 206, signal detection section 207, and post-processing section 208.

Storage section 201 stores the same signal-waveform switching patterns as storage section 101.

Control section 202 determines signal waveforms of symbols according to the signal-waveform switching pattern notified by base station 10 (control section 102), and indicates one or more of the signal waveforms to preprocessing section 205, signal detection section 207, and post-processing section 208 for each of the TTIs.

Reception section 204 performs RF processing, such as amplification, downconversion, Analog-to-Digital (A/D) conversion, and the like on a radio signal received by antenna 203, and outputs a baseband time domain signal (DL signal) to preprocessing section 205.

Preprocessing section 205 preprocesses the time domain signal output from reception section 204 according to the signal waveforms indicated by control section 202, and outputs the preprocessed signal to FFT section 206. For example, when DFT-s-OFDM is indicated, preprocessing section 205 performs serial-to-parallel conversion of the time domain signal output from reception section 204, removes appended CPs, and outputs the resulting time domain signal to FFT section 206. When UW-DFT-s-OFDM is indicated, preprocessing section 205 performs serial-to-parallel conversion of the time domain signal output from reception section 204, and outputs the resulting time domain signal to FFT section 206.

FFT section 206 performs the fast Fourier transform on the time domain signal output from preprocessing section 205, and outputs the obtained frequency domain signal to signal detection section 207.

Signal detection section 207 performs, on the signal output from FFT section 206, equalization processing in accordance with the signal waveforms indicated by control section 202 and outputs the signal resulting after the equalization processing to post-processing section 208.

Post-processing section 208 performs, according to the signal waveforms indicated by control section 202, post-processing on the frequency domain signal output from signal detection section 207, and obtains output data (modulated symbol sequence). For example, when DFT-s-OFDM is indicated, post-processing section 208 performs inverse discrete Fourier transform on the frequency domain signal output from signal detection section 207 and performs parallel-to-serial conversion on the resultant time domain signal to obtain output data. When UW-DFT-s-OFDM is indicated, post-processing section 208 performs inverse discrete Fourier transform on the frequency domain signal output from signal detection section 207, removes UWs from the resultant time domain signal, and performs parallel-to-serial conversion on the time domain signal to obtain output data.

<Operation of Control Section 102>

Next, operations of control section 102 in the embodiment of the present invention are described in detail in conjunction with illustration of the signal-waveform switching patterns stored in storage section 101.

FIG. 3 illustrates one example of the signal-waveform switching patterns stored in storage section 101. In this example, a Configuration ID is assigned for each of the signal-waveform switching patterns, and one or more signal waveforms to be transmitted in each of the TTIs specified by TTI index are configured for each of the Configuration IDs. For example, the DFT-S-OFDM-based (or OFDM-based) signal waveform ("O/D" in FIG. 3) is configured for the TTI indicated by the Configuration ID "#1" and the TTI index "0."

Control section 102 determines one or more signal waveforms for each of the TTIs based on a selected Configuration ID, and indicates the one or more signal waveforms to preprocessing section 103, mapping section 104, and post-processing section 106.

Figure 4A:
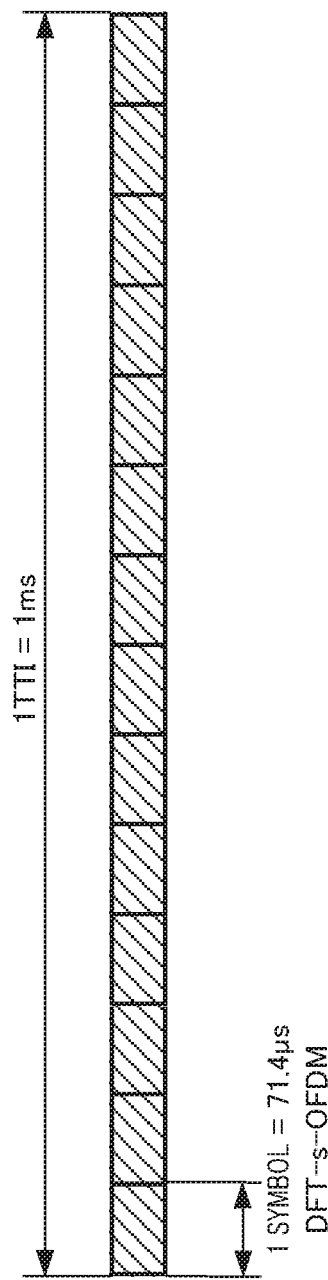
FIG. 4 illustrates an example of symbols mapped to a TTI at the radio base station according to Embodiment 1.

For example, when control section 102 selects the Configuration ID "#1," control section 102 indicates to generate the DFT-S-OFDM-based (or OFDM-based) signal waveform ("O/D" in FIG. 3) in 14 consecutive symbols in the TTI indicated by the TTI index "0." Consequently, as illustrated in FIG. 4A, transmission can be made in 14 symbols (=71.4 μs×14=1 ms) in one TTI (=1 ms), and the end of the 14th symbol corresponds exactly to the end of the TTI. In addition, since the DFT-S-OFDM and OFDM symbol lengths are the same as each other, both of DFT-S-OFDM and OFDM may be used together in one symbol.

Figure 4B:
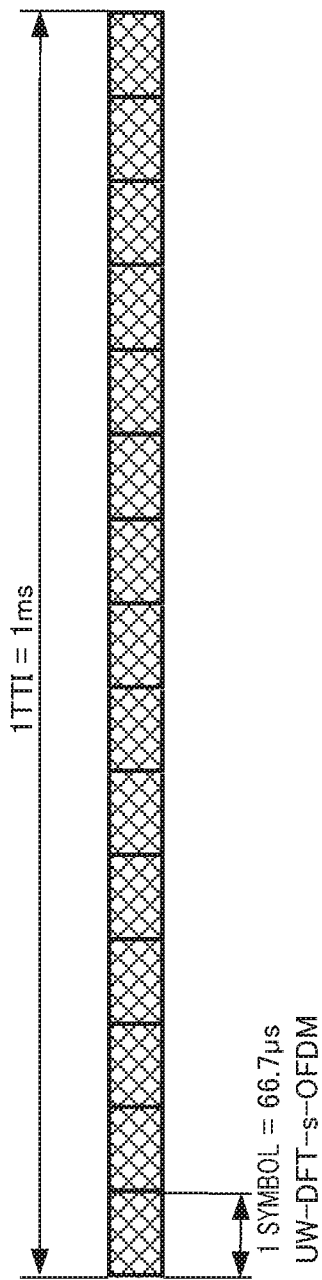

In addition, when control section 102 selects the Configuration ID "#1," control section 102 indicates to generate the UW-DFT-S-OFDM-based signal waveform ("U" in FIG. 3) in 15 consecutive symbols in the TTI indicated by the TTI index "1." Consequently, as illustrated in FIG. 4B, transmission can be made in 15 symbols (=66.7 μs×15=1 ms) in one TTI (=1 ms), and the end of the 15th symbol corresponds exactly to the end of the TTI.

Note that, although FIG. 3 illustrates the example in which DFT-S-OFDM and UW-DFT-S-OFDM are switched for each of the TTIs, the embodiment of the present invention is not limited to this example, and symbol length pattern A and symbol length pattern B may be switched for each of the TTIs. In this case, it can be considered that symbol length pattern A is 71.4 ms×14 symbol=1 ms and symbol length pattern B is 66.7 ms×15 symbol=1 ms, for example. Additionally, pattern C of an exceptional symbol length and an exceptional number of symbols, or pattern D in which a symbol length is changed for each symbol and the symbol lengths totals one TTI may also be provided.

Note that, the method for selecting a Configuration ID is not particularly limited in the embodiment of the present invention. For example, control section 102 may select a Configuration ID (number of symbols per unit time) based on Reference Signal Received Power (RSRP), Reference Signal Received Quality (RSRQ), or Channel Quality Indicator (CQI) reported by terminal 20, or may select a Configuration ID depending on a channel estimation value or the like estimated on the side of base station 10.

<Example of Notification of Signal-Waveform Switching Pattern>

Next, a method for notifying terminal 20 (control section 202) of a signal-waveform switching pattern from base station 10 (control section 102) is described.

Base station 10 may notify terminal 20 of information indicating the signal-waveform switching pattern explicitly or implicitly.

For example, base station 10 may notify terminal 20 of the signal-waveform switching pattern by Radio Resource Control (RRC) signaling, Medium Access Control (MAC) signaling, physical layer (PHY) signaling, or the like when base station 10 notifies terminal 20 of the signal-waveform switching pattern explicitly. By way of example, base station 10 may notify terminal 20 of the signal-waveform switching pattern using Master Information Block (MIB), System Information Block (SIB), RACH message 2 (which may also be referred to as Random Access Response: RAR), Paging information, RRC connection information, S1 connection configuration, or the like.

Base station 10 may also notify terminal 20 of the signal-waveform switching pattern using Downlink Control Information (DCI) on PDCCH.

In addition, base station 10 and terminal 20 may, for example, associate a configuration and the like of a Synchronization Signal (SS), PBCH, SIB, or RACH with the signal-waveform switching pattern (for example, Configuration ID) such that the configuration of SS or the like and the signal-waveform switching pattern have a one-to-one correspondence, when base station 10 notifies terminal 20 of the signal-waveform switching pattern implicitly. For example, when a plurality of patterns of configuration are specified for each of SS, PBCH, SIB, and RACH, the plurality of patterns may be grouped to be associated with mutually different Configuration IDs. In grouping, a signal-waveform switching pattern suitable for use in a communication environment in which one of the plurality of patterns (for example, one of the plurality of patterns in which subcarrier spacings of SS are different from each other) is used may be associated with the one of the plurality of patterns.

Base station 10 transmits, to terminal 20, a signal of a group associated with a signal-waveform switching pattern configured for terminal 20. Terminal 20 then identifies, as the signal-waveform switching pattern configured for terminal 20, the signal-waveform switching pattern (Configuration ID) associated with the group to which the signal transmitted by base station 10 belongs. Through these processing, implicit notification of the signal-waveform switching pattern is achieved using the existing signals, so that no new signaling is necessary for notification of the signal-waveform switching pattern.

Note that, base station 10 may notify terminal 20 of a signal-waveform switching pattern periodically or dynamically.

Effect of Embodiment

As described above, in the embodiment of the present invention, it is possible to control such that no signal-waveform switching takes place within each of the TTIs, and thus to use together a plurality of signal waveforms whose symbol lengths are different from one signal waveform to another without causing any symbol to span two adjacent TTIs.

Embodiment 2

Embodiment 2 is described in relation to a case where signal-waveform switching takes place within one TTI. Note that, since the configuration of a terminal in Embodiment 2 is the same as that of terminal 20 illustrated in FIG. 2 except that storage section 201 is removed, descriptions for the configuration of the terminal are omitted.

<Radio Base Station>

Figure 5:
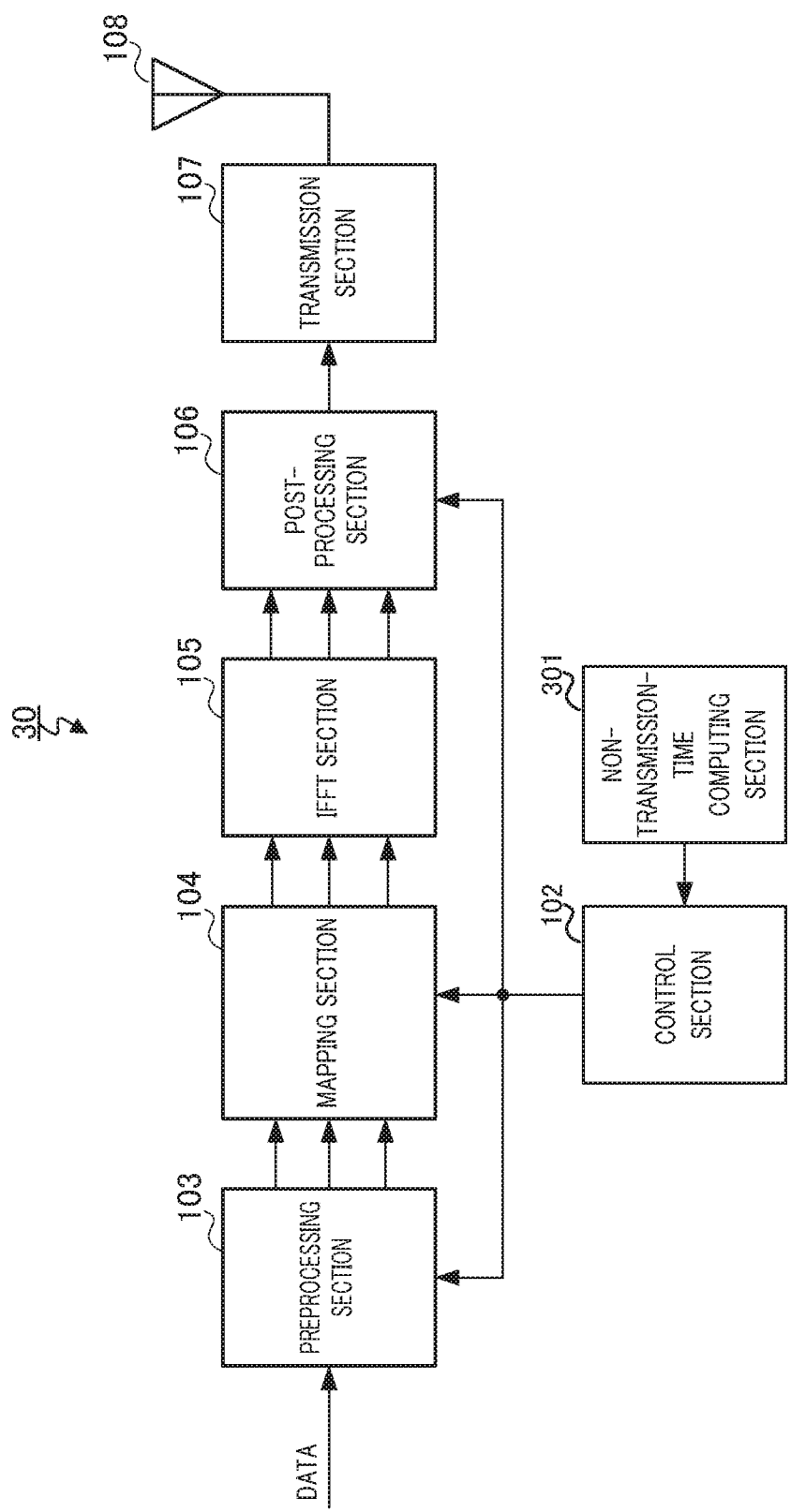
FIG. 5 is a block diagram illustrating an exemplary configuration of a radio base station according to Embodiment 2.

FIG. 5 is a block diagram illustrating an exemplary configuration of base station 30 according to Embodiment 2. Note that, in base station 30 illustrated in FIG. 5, components the same as those of base station 10 illustrated in FIG. 1 are provided with the same reference signs and descriptions for such components are omitted.

In base station 30 of FIG. 5, a configuration is adopted in which storage section 101 is removed from and non-transmission-time computing section 301 is added to base station 10 of FIG. 1.

When signal-waveform switching takes place within one TTI, non-transmission-time computing section 301 computes, using the following Equation 1, total time during which no transmission takes place, and outputs, to control section 102, the information indicating computed total time Tn during which no transmission takes place:

$$Tn = T_{TTI} - (T_D \times N_D + T_U \times N_U) \quad \text{(Equation 1)}$$

In Equation 1, $T_{TTI}$ denotes one TTI (for example, 1 ms), $T_D$ denotes one DFT-S-OFDM symbol time (for example, 71.4 µs), $N_D$ denotes the number of DFT-S-OFDM symbols, $T_U$ denotes one UW-DFT-S-OFDM symbol time (for example, 66.7 µs), and $N_U$ denotes the number of UW-DFT-S-OFDM symbols.

Figure 6:
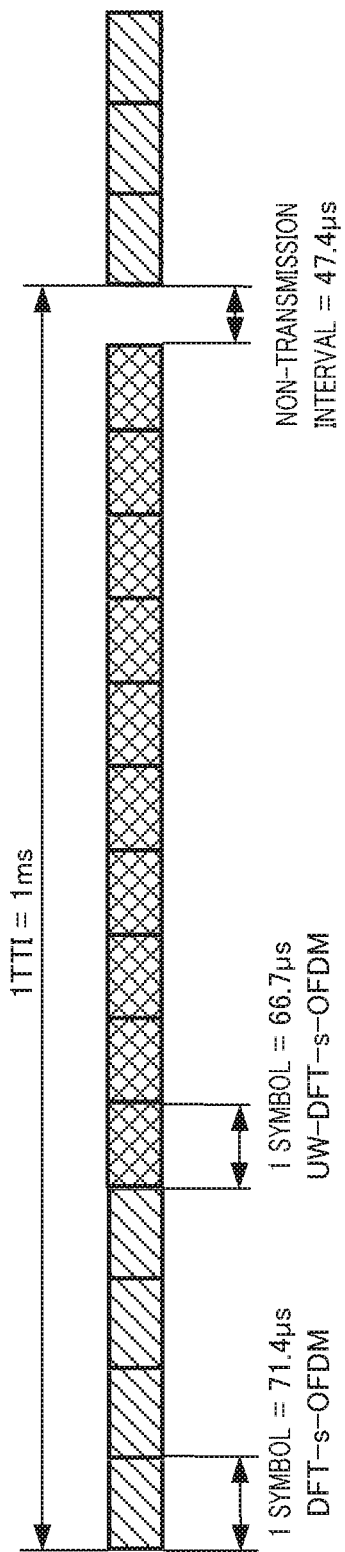
FIG. 6 illustrates an example of symbols mapped to a TTI at the radio base station according to Embodiment 2.

For example, in a case where four DFT-S-OFDM symbols and ten UW-DFT-S-OFDM symbols are mapped within one TTI as illustrated in FIG. 6, total time Tn during which no transmission takes place amounts to 47.4 µs (=1000−(71.4×4+66.7×10)).

Note that, $T_D$ and $T_U$ may be replaced with symbol length patterns A and B in above-mentioned Equation 1. In this case, it can be considered that symbol length pattern A is 71.4 µs and symbol length pattern B is 66.7 µs, for example. In addition, above-mentioned Equation 1 may be extended to a pattern including three or more kinds of symbol lengths, such as symbol length pattern C.

Control section 102 determines, for each of the TTIs, the numbers of symbols of signal waveforms, and indicates the signal waveforms to preprocessing section 103, mapping section 104, and post-processing section 106. In addition, control section 102 configures a non-transmission interval in each of the TTIs so that the non-transmission interval equals to the total time during which no transmission takes place, as computed by non-transmission-time computing section 301, and control section 102 indicates post-processing section 106 not to transmit anything in the configured non-transmission interval.

Post-processing section 106 does not output anything to transmission section 107 in the non-transmission interval indicated by control section 102.

In addition, base station 10 (control section 102) notifies terminal 20 (control section 202) of information indicating the numbers of symbols of the signal waveforms within one TTI. A concrete example of the notification method is described below.

Control section 202 determines signal waveforms according to the numbers of symbols of the signal waveforms within one TTI as notified by base station 10 (control section 102), and indicates the signal waveforms to preprocessing section 205, signal detection section 207, and post-processing section 208.

<Example of Notification of Number of Symbols of Signal Waveform>

Next, a method for notifying terminal 20 (control section 202) of the numbers of symbols of signal waveforms from base station 30 (control section 102) is described.

Base station 30 may notify terminal 20 of the information indicating the numbers of symbols of the signal waveforms mapped within one TTI, explicitly or implicitly.

For example, base station 30 may notify terminal 20 of the numbers of symbols of the signal waveforms by RRC signaling, MAC signaling, PHY signaling, or the like when base station 30 notifies terminal 20 of the numbers of symbols of the signal waveforms explicitly. By way of example, base-station 30 may notify terminal 20 of the numbers of symbols of the signal waveforms using MIB, SIB, RACH message 2, Paging information, RRC connection information, S1 connection configuration, or the like.

In addition, base station 30 may notify terminal 20 of the numbers of symbols of the signal waveforms using DCI on PDCCH.

For example, in a case where a plurality of CP lengths are specified, three or more variables of N, M, and L may be notified by DCI, where M denotes the CP length of first N symbols and L denotes the CP length of the remaining symbols.

Only the variable of N may also be notified by DCI, in which case the CP length of first N symbols is pattern A and the CP length of the remaining symbols is pattern B. In this case, the CP lengths of patterns A and B are defined in specifications in advance or notified using a method, such as MIB, SIB, message 2, Paging information, RRC connection configuration, S1 connection configuration, or the like.

The patterns of CP lengths may also be three or more: for example, the CP length of first N symbols is pattern A, the CP length of M symbols from the symbol next to the last one of the first N symbols is pattern B, and the CP length of symbols other than the N symbols and the M symbols is pattern C. In this case, two variables of N and M are notified by DCI.

In addition, base station 30 and terminal 20 may associate configurations and the like of a synchronization signal, PBCH, SIB, or RACH, for example, with the numbers of symbols of signal waveforms such that the configurations and the like of the synchronization signal or the like and the numbers of symbols of the signal waveforms have a one-to-one correspondence, when base station 30 notifies terminal 20 of the numbers of symbols of the signal waveforms implicitly. Through these methods, implicit notification of the numbers of symbols of the signal waveforms is achieved using the existing signals, so that no new signaling is necessary for notification of the number of symbols of the signal waveform.

Note that, base station 30 may notify terminal 20 of the number of symbols of the signal waveform periodically or dynamically.

Effect of Embodiment

As described above, in the embodiment of the present invention, time in which no symbol is mapped in each of the TTIs (time shorter than one symbol) can be configured as non-transmission time in a case where signal-waveform switching takes place within one TTI, so that it is possible to use together a plurality of signal waveforms whose symbol lengths are different from one signal waveform to another without causing any symbol to span two adjacent TTIs.

Note that, although FIG. 6 illustrates the case where the non-transmission interval is configured at the last of TTI, the embodiment of the present invention is not particularly limited in the respect of the position of non-transmission interval. For example, the non-transmission interval may be configured at the beginning of TTI or at a position where signal-waveform switching takes place (between 4th and 5th symbols in the example of FIG. 6). The non-transmission interval in one TTI may also be divided into a plurality of non-transmission intervals in the embodiment of the present invention.

In an embodiment of the present invention, filtering may also be carried out before or after the non-transmission interval so that the discontinuity of symbols should be avoided. Note that the non-transmission interval in this case is not an interval during which transmission does not take place completely.

Modification 1 of Embodiment 2

In Embodiment 2, the subcarrier spacing may be changed for each of the signal waveforms by mapping section 104. For a signal waveform in which the subcarrier spacing is made wider, one symbol time of the signal waveform can be shortened according to the wideness of the subcarrier spacing. Thus, base station 30 increases the number of symbols to be mapped within one TTI correspondingly. As a result, the possibility increases that total time Tn during which no transmission takes place within one TTI can be shortened.

Figure 7:
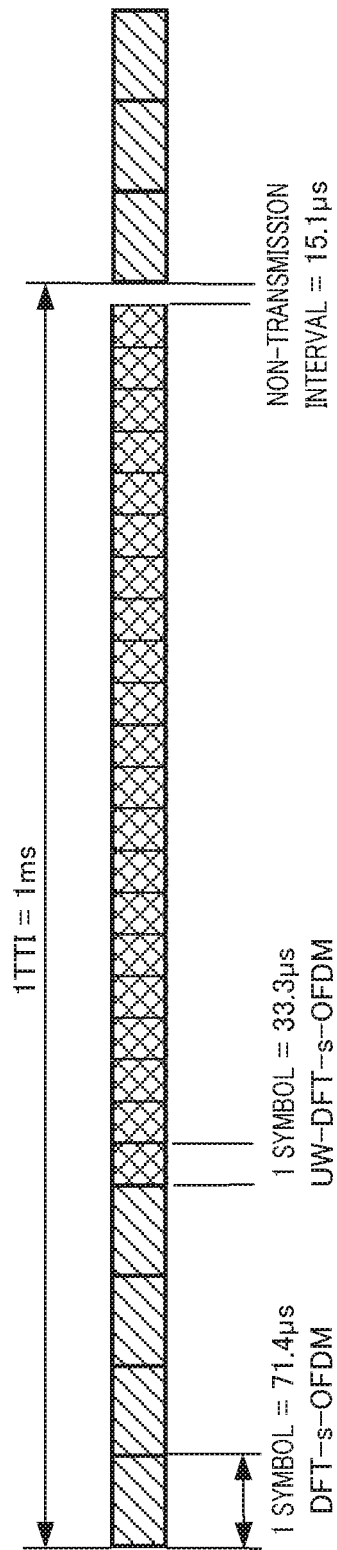
FIG. 7 illustrates another example of symbols mapped to a TTI at the radio base station according to Embodiment 2.

For example, the UW-DFT-S-OFDM symbol time is 33.3 μs when the UW-DFT-S-OFDM subcarrier spacing is 30 kH, so that 21 UW-DFT-S-OFDM symbols can be mapped after mapping of four DFT-S-OFDM symbols within one TTI as illustrated in FIG. 7. As a result, total time Tn during which no transmission takes place is 15.1 μs (=1000−71.4×4+33.3×21).

In this way, it is possible to shorten the total time during which no transmission takes place, and thus to reduce the overhead by making wider the subcarrier spacing of the signal waveform.

Embodiment 3

Embodiment 3 is described in relation to a case where signal-waveform switching takes place within one TTI and where a combination of signal waveforms by which a non-transmission interval is made zero is selected. Note that, since the configuration of a terminal in Embodiment 3 is the same as that of terminal 20 illustrated in FIG. 2, descriptions for the configuration of the terminal are omitted. In addition, the configuration of the base station in Embodiment 3 is the same as that of base station 10 illustrated in FIG. 1. However, in Embodiment 3, contents to be stored in storage sections 101 and 201 and operations of control sections 102 and 202 are different from those in Embodiment 1.

<Operation of Control Section 102>

Next, the operations of control section 102 in the embodiment of the present invention are described in detail in conjunction with illustration of combination patterns stored in storage section 101.

FIG. 8 illustrates exemplary combination patterns of subcarrier spacing and numbers of symbols of signal waveforms to be transmitted in one TTI (hereinafter, simply referred to as "combination pattern") as stored in storage section 101. As combination patterns, only combination patterns by which the non-transmission time is made zero, that is, combination patterns by which the transmission time of signal waveforms totals one TTI exactly, are accepted.

In this example, a Configuration ID is assigned for each of the combination patterns, and the subcarrier spacing, symbol length, and the numbers of symbols of signal waveforms to be transmitted in one TTI are configured for each of the Configuration IDs. For example, in the case where the Configuration ID is "#1," seven symbols of DFT-S-OFDM-based signal waveform are mapped with a subcarrier spacing of 15 kHz and 30 symbols of UW-DFT-S-OFDM-based signal waveform are mapped with a subcarrier spacing of 60 kHz in one TTI. As a result, total time Tn during which no transmission takes place is 0 μs (=1000−71.4×7+16.7×30).

Control section 102 determines the subcarrier spacing and the numbers of symbols of signal waveforms to be mapped in one TTI based on a selected Configuration ID, and indicates the subcarrier spacing and the numbers of symbols of the signal waveforms to preprocessing section 103, mapping section 104, and post-processing section 106.

In addition, base station 10 (control section 102) notifies terminal 20 (control section 202) of information indicating the selected combination pattern. Note that, the notification method of the combination pattern is the same as the notification method of the signal-waveform switching pattern described in Embodiment 1.

Control section 202 determines signal waveforms of symbols according to the combination pattern notified by base station 10 (control section 102), and indicates the signal waveforms to preprocessing section 205, signal detection section 207, and post-processing section 208.

Note that, the method for selecting the Configuration ID is not particularly limited in the embodiment of the present invention as with Embodiment 1.

Effect of Embodiment

In this way, the combination of signal waveforms by which the non-transmission interval is made zero is selected when signal-waveform switching takes place within one TTI in the embodiment of the present invention, so that it is possible to use together a plurality of signal waveforms whose symbol lengths are different from one signal waveform to another without causing any symbol to span two adjacent TTIs and in such a manner that the signal waveforms are mapped continuously.

Embodiment 4

Embodiment 4 is described in relation to a case where signal-waveform switching takes place within one TTI and where the subcarrier spacing of a predetermined signal waveform is adjusted to be narrower such that a non-transmission interval is made zero. Note that, since the configuration of a terminal in Embodiment 4 is the same as that of terminal 20 illustrated in FIG. 2 except that storage section 201 is removed, descriptions for the configuration of the terminal are omitted.

<Radio Base Station>

Figure 9:
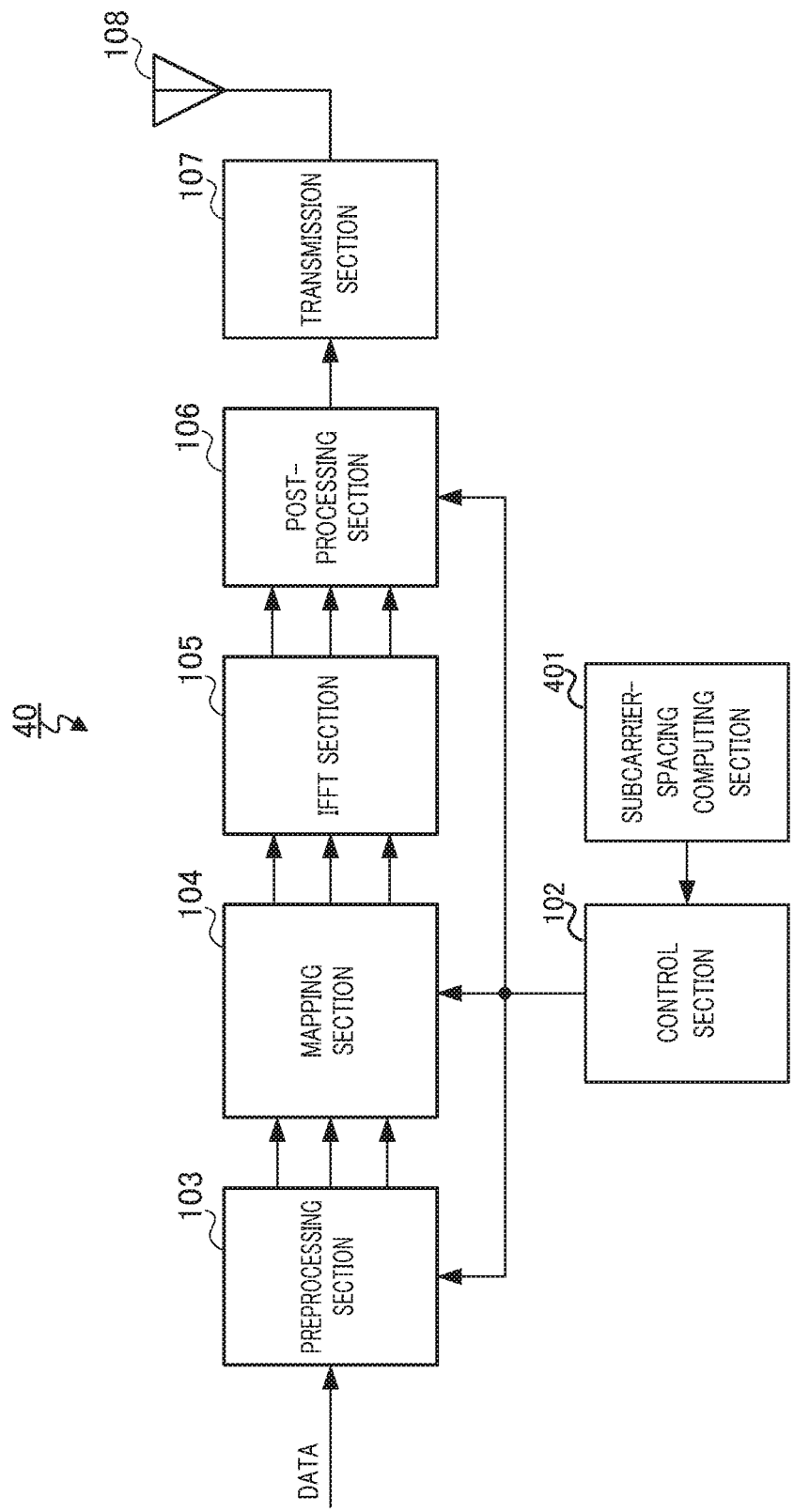
FIG. 9 is a block diagram illustrating an exemplary configuration of a radio base station according to Embodiment 4.

FIG. 9 is a block diagram illustrating an exemplary configuration of base station 40 according to Embodiment 4. Note that, in base station 40 illustrated in FIG. 9, components the same as those of base station 10 illustrated in FIG. 1 are provided with the same reference signs and descriptions for such components are omitted.

In base station 40 of FIG. 9, a configuration is adopted in which storage section 101 is removed from and subcarrier-spacing computing section 401 is added to base station 10 of FIG. 1.

Subcarrier-spacing computing section 401 computes the subcarrier spacing of the predetermined signal waveform (UW-DFT-S-OFDM in this example) using the following Equation 2 when signal-waveform switching takes place within one TTI, and outputs the information indicating computed subcarrier spacing $F_U$ to control section 102:

$$F_U = F_{U'} \times T_U / T_D \quad \text{(Equation 2)}$$

In Equation 2, $F_{U'}$ denotes an initial value (for example, 15 kHz) of the UW-DFT-S-OFDM subcarrier spacing, $T_U$ denotes one UW-DFT-S-OFDM symbol time (for example, 66.7 μs), and $T_D$ denotes one DFT-S-OFDM symbol time (for example, 71.4 μs).

For example, in a case where both of the initial values of the DFT-S-OFDM subcarrier spacing and UW-DFT-S-OFDM subcarrier spacing are 15 kHz, one DFT-S-OFDM symbol time is 71.4 μs, and one UW-DFT-S-OFDM symbol time is 66.7 μs, UW-DFT-S-OFDM subcarrier spacing $F_U$ is computed to be 14 kHz (=15×66.7/71.4).

Figure 10:
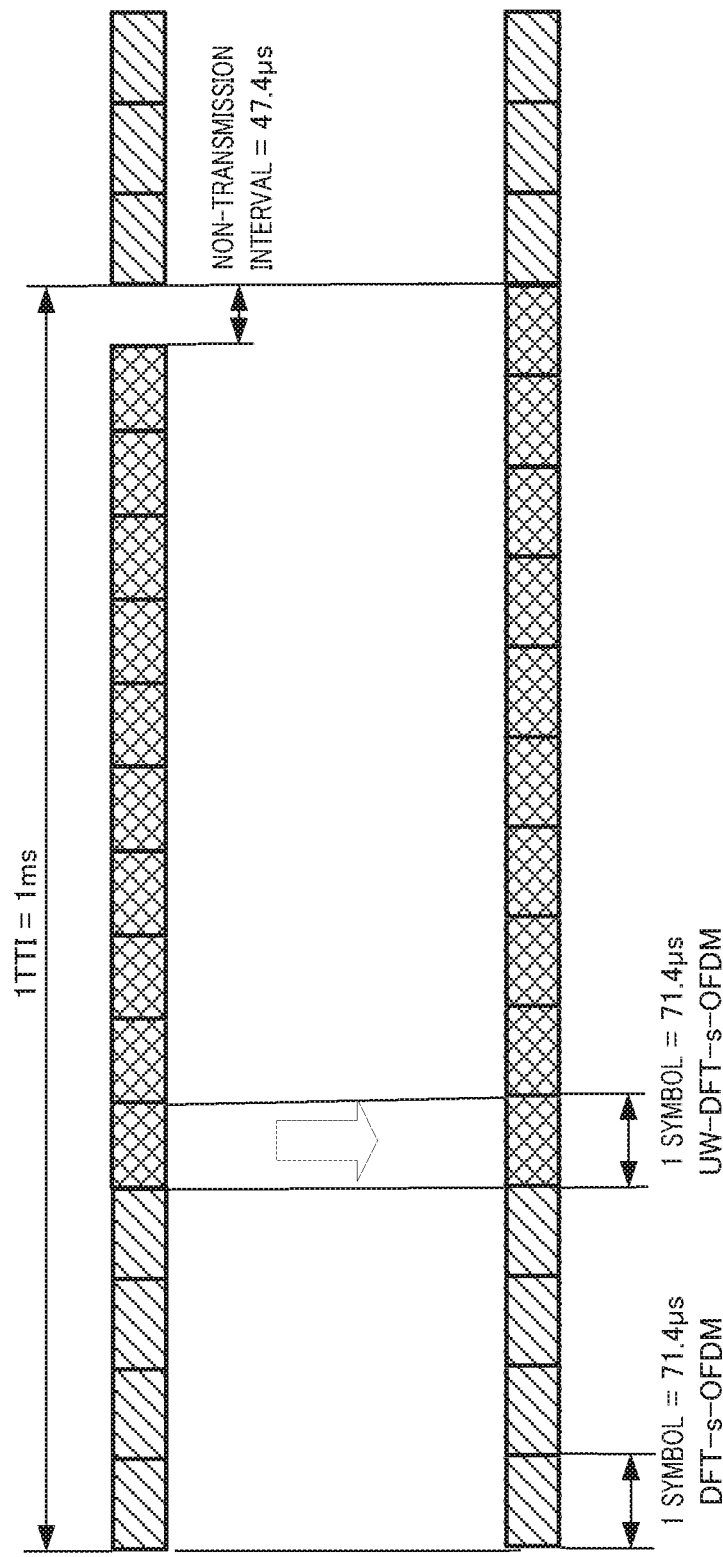
FIG. 10 illustrates an example of a combination pattern of subcarrier spacing and the numbers of symbols of signal waveforms as stored in the radio base station according to Embodiment 4.

As a result, one UW-DFT-S-OFDM symbol time is computed to be 71.4 μs, and as illustrated in FIG. 10, total time Tn during which no transmission takes place is made zero.

Control section 102 determines, for each of the TTIs, the numbers of symbols of signal waveforms, and indicates the signal waveforms to preprocessing section 103, mapping section 104, and post-processing section 106. Control section 102 indicates the UW-DFT-S-OFDM subcarrier spacing computed by subcarrier-spacing computing section 401 to mapping section 104.

Mapping section 104 performs, in addition to the operation described in the above-mentioned Embodiment 2, an operation of adjusting the UW-DFT-S-OFDM subcarrier spacing based on the indication by control section 102.

In addition, base station 40 (control section 102) notifies terminal 20 (control section 202) of information indicating the adjusted subcarrier spacing. Note that, the notification method of the adjusted subcarrier spacing is the same as the notification method of the signal-waveform switching pattern described in Embodiment 1.

Control section 202 determines signal waveforms of symbols according to the numbers of symbols of signal waveforms within one TTI as notified by base station 40 (control section 102), and indicates the signal waveforms to preprocessing section 205, signal detection section 207, and post-processing section 208. In addition, control section 202 indicates, to signal detection section 207, the UW-DFT-S-OFDM subcarrier spacing notified by base station 40 (control section 102).

Signal detection section 207 performs, in addition to the operation described in the above-mentioned Embodiment 2, equalization processing with respect to UW-DFT-S-OFDM in which the subcarrier spacing is adjusted based on the indication by control section 202.

Effect of Embodiment

In this way, the subcarrier spacing of a signal waveform is adjusted when signal-waveform switching takes place within one TTI in the embodiment of the present invention, so that it is possible to use together a plurality of signal waveforms whose symbol lengths are different from one signal waveform to another without causing any symbol to span two adjacent TTIs and in such a manner that the signal waveforms are mapped continuously.

Embodiment 5

Embodiment 5 is described in relation to a case where signal-waveform switching takes place within one TTI and where a CP length is adjusted to be longer so that a non-transmission interval should be made zero. Note that, since the configuration of a terminal in Embodiment 5 is the same as that of terminal 20 illustrated in FIG. 2 except that storage section 201 is removed, descriptions for the configuration of the terminal are omitted.

<Radio Base Station>

Figure 11:
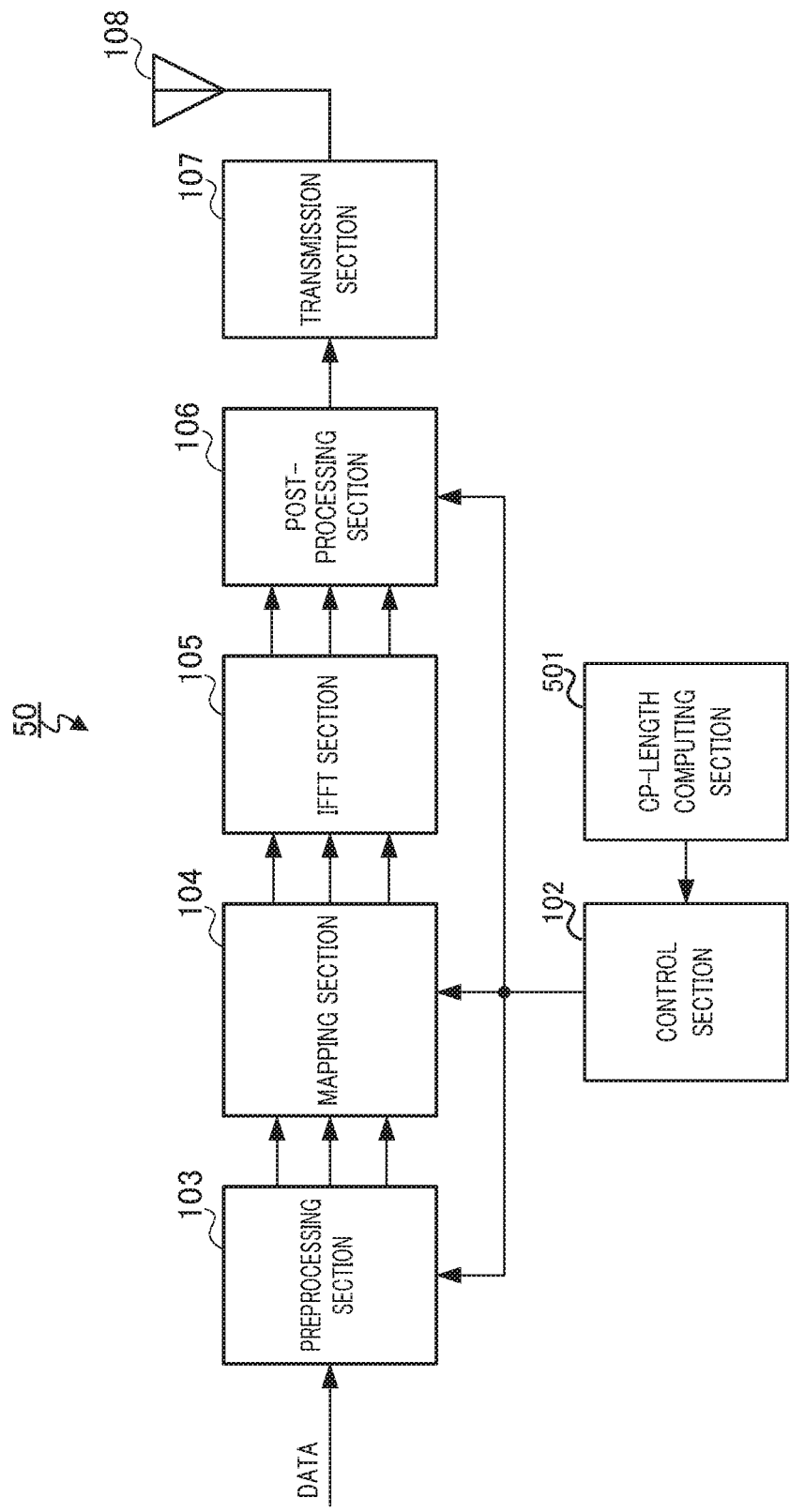
FIG. 11 is a block diagram illustrating an exemplary configuration of a radio base station according to Embodiment 5.

FIG. 11 is a block diagram illustrating an exemplary configuration of base station 50 according to Embodiment 5. Note that, in base station 50 illustrated in FIG. 11, components the same as those of base station 10 illustrated in FIG.

1 are provided with the same reference signs and descriptions for such components are omitted.

In base station 50 of FIG. 11, a configuration is adopted in which storage section 101 is removed from and CP-length computing section 501 is added to base station 10 of FIG. 1.

CP-length computing section 501 computes the CP length of a predetermined signal waveform (DFT-S-OFDM in this example) using the following Equation 3 when signal-waveform switching takes place within one TTI, and outputs the information indicating computed CP length $C_D$ to control section 102.

$$C_D = C_{Df} Tn/N_D \quad \text{(Equation 3)}$$

In Equation 3, $C_{Df}$ denotes an initial value of CP length of DFT-S-OFDM (for example, 4.7 μs), Tn denotes total time during which no transmission takes place, and $N_D$ denotes the number of DFT-S-OFDM symbols.

For example, in a case where the initial value of one DFT-S-OFDM symbol time is 71.4 μs, one UW-DFT-S-OFDM symbol time is 66.7 μs, and four DFT-S-OFDM symbols and ten UW-DFT-S-OFDM symbols are mapped, the total time during which no transmission takes place is 47.6 μs (see Embodiment 2) and the CP length of DFT-S-OFDM is computed to be 16.6 μs (=4.7+47.4/4).

Figure 12:
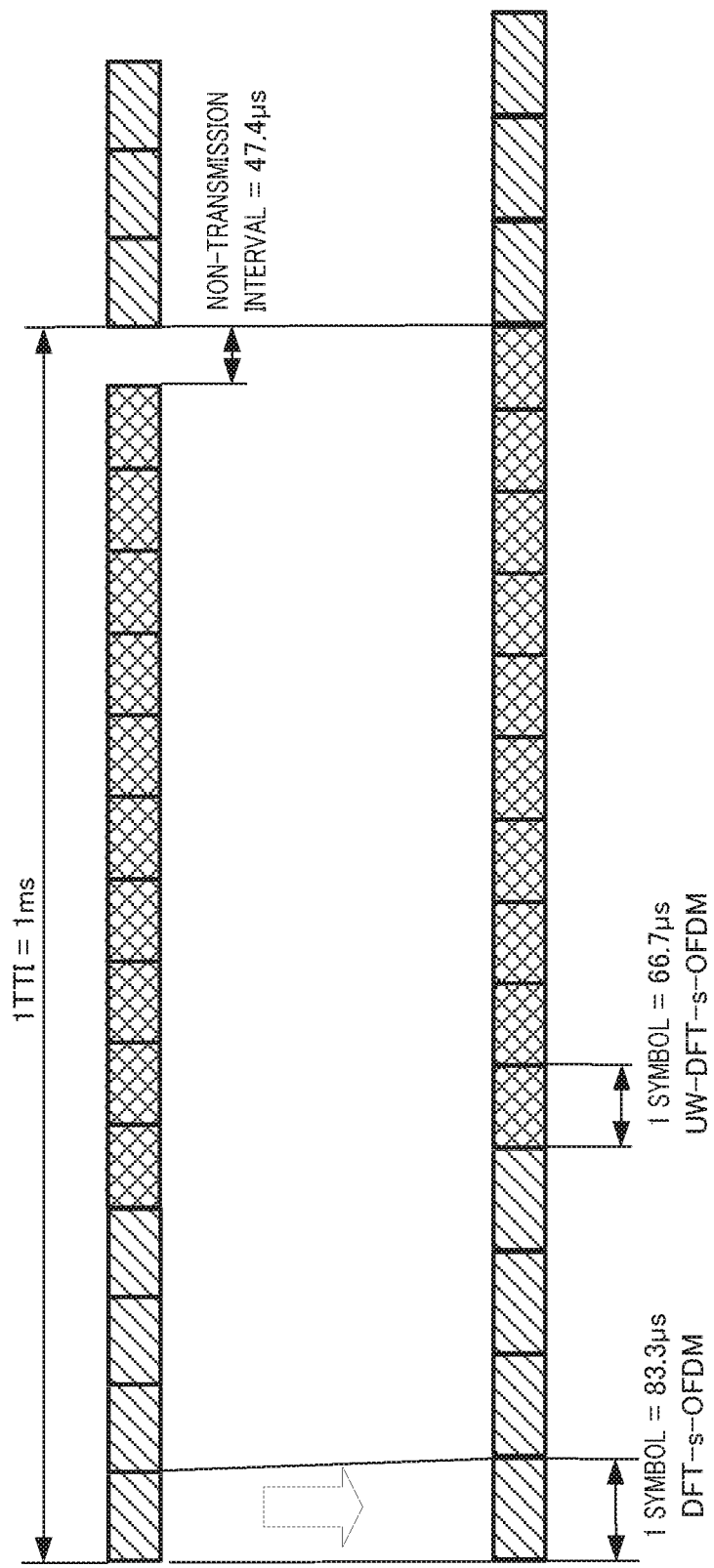
FIG. 12 illustrates an example of a combination pattern of subcarrier spacing and the numbers of symbols of signal waveforms as stored in the radio base station according to Embodiment 5.

As a result, one DFT-S-OFDM symbol time is computed to be 83.3 μs (=71.4+16.6−4.7), and as illustrated in FIG. 12, total time Tn during which no transmission takes place is made 0 (=1000−(83.3×4+66.7×10)).

Control section 102 determines, for each of the TTIs, the numbers of symbols of signal waveforms, and indicates the signal waveforms to preprocessing section 103, mapping section 104, and post-processing section 106. In addition, control section 102 indicates the CP length of DFT-S-OFDM computed by CP-length computing section 501 to post-processing section 106.

Post-processing section 106 performs, in addition to the operation described in the above-mentioned Embodiment 2, an operation of adjusting the CP length of DFT-S-OFDM based on the indication by control section 102.

In addition, base station 50 (control section 102) notifies terminal 20 (control section 202) of information indicating the adjusted CP length. Note that, the notification method of the adjusted CP length is the same as the notification method of the signal-waveform switching pattern described in Embodiment 1.

Control section 202 determines signal waveforms of symbols according to the numbers of symbols of signal waveforms within one TTI as notified by base station 50 (control section 102), and indicates the signal waveforms to preprocessing section 205, signal detection section 207, and post-processing section 208. In addition, control section 202 indicates, to preprocessing section 205, the CP length of DFT-S-OFDM notified by base station 50 (control section 102).

Preprocessing section 205 preprocesses DFT-S-OFDM in which the CP length is adjusted, in addition to the operation described in the above-mentioned Embodiment 2 and based on the indication by control section 202.

Effect of Embodiment

In this way, the CP length of a signal waveform is adjusted when signal-waveform switching takes place within one TTI in the embodiment of the present invention, so that it is possible to use together a plurality of signal waveforms whose symbol lengths are different from one signal waveform to another without causing any symbol to span beyond the one TTI and in such a manner that the signal waveforms are mapped continuously.

Note that Zadoff-Chu sequence or zero padding may be used as a Unique Word (UW).

Note that the above-mentioned embodiments may be combine with one another.

The embodiments of the invention have been described above.

(Hardware Configuration)

Note that the block diagrams used to describe the embodiments illustrate blocks on the basis of functions. These functional blocks (constituent sections) are implemented by any combination of hardware and/or software. A means for implementing the functional blocks is not particularly limited. That is, the functional blocks may be implemented by one physically and/or logically coupled apparatus. Two or more physically and/or logically separated apparatuses may be directly and/or indirectly (for example, via wires and/or wirelessly) connected, and the plurality of apparatuses may implement the functional blocks.

Figure 13:
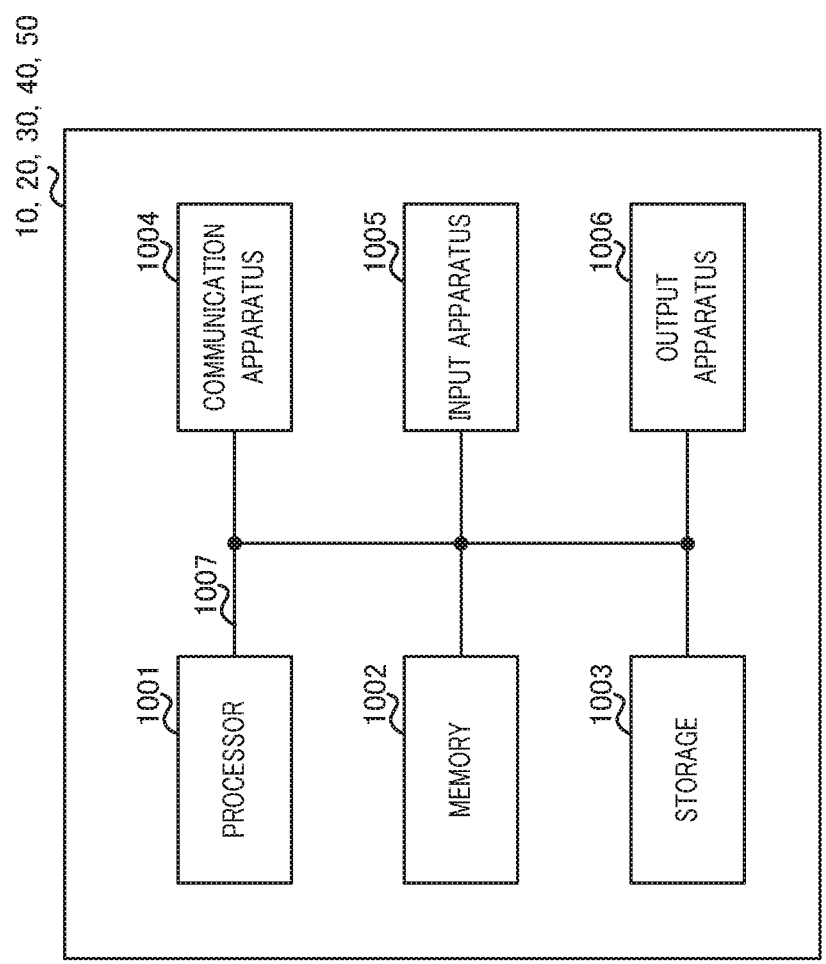
FIG. 13 illustrates an exemplary hardware configuration of a radio base station and a user terminal according to one embodiment of the present invention.

For example, the radio base station, the user terminal, and the like according to an embodiment of the present invention may function as a computer that executes processing of a radio communication method of the present invention. FIG. 13 illustrates an example of a hardware configuration of the radio base station and the user terminal according to an embodiment of the present invention. Radio base station 10, 30, 40, or 50 and user terminal 20 as described above may be physically constituted as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of radio base station 10, 30, 40, or 50 and of user terminal 20 may include one apparatus or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or in another manner. Note that processor 1001 may be implemented by one or more chips.

The functions in radio base station 10, 30, 40, or 50 and user terminal 20 are implemented by predetermined software (program) loaded into hardware, such as processor 1001, memory 1002, and the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, control sections 102 and 202, preprocessing sections 103 and 205, mapping section 104, IFFT section 105, post-processing sections 106 and 208, FFT section 206, signal detection section 207, and the like as described above may be implemented by processor 1001.

Processor 1001 reads out a program (program code), a software module, or data from storage 1003 and/or communication apparatus 1004 to memory 1002 and executes various types of processing according to the read-out program or the like. The program used is a program for causing the computer to execute at least part of the operation described in the embodiments. For example, control section 102 of radio base station 10 may be implemented by a control program stored in memory 1002 and operated by processor 1001, and the other functional blocks may also be implemented in the same way. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to an embodiment of the present invention.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may also be called an auxiliary storage apparatus. For example, storage section 101 and 201 and the like as described above may be implemented by storage 1003. The storage medium as described above may also be a database, server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, transmission section 107, antenna 108 and 203, reception section 204, and the like as described above may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, radio base station 10, 30, 40, or 50 and user terminal 20 may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented by at least one of these pieces of hardware.

(Notification and Signaling of Information)

The notification of information is not limited to the aspects or embodiments described in the present specification, and the information may be notified by another method. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

(Adaptive System)

The aspects and embodiments described in the present specification may be applied to a system using LTE (Long Term Evolution), LTE-A (LTE-Advanced), SUPER 3G IMT-Advanced, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system extended based on the above systems.

(Processing Procedure and the Like)

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

(Operation of Base Station)

Specific operations which are described in the specification as being performed by the base station (radio base station) may sometimes be performed by an upper node depending on the situation. Various operations performed for communication with a terminal in a network constituted by one network node or a plurality of network nodes including a base station can be obviously performed by the base station and/or a network node other than the base station (examples include, but not limited to, MME (Mobility Management Entity) or S-GW (Serving Gateway)). Although there is one network node in addition to the base station in the case illustrated above, a plurality of other network nodes may be combined (for example, MME and S-GW).

(Direction of Input and Output)

The information, the signals, and the like can be output from a higher layer (or a lower layer) to a lower layer (or a higher layer). The information, the signals, and the like may be input and output through a plurality of network nodes.

(Handling of Input and Output Information and the Like)

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

(Determination Method)

The determination may be made based on a value expressed by one bit (0 or 1), based on a Boolean value (true or false), or based on comparison with a numerical value (for example, comparison with a predetermined value).

(Software)

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

(Information and Signals)

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, or the like.

("System" and "Network")

The terms "system" and "network" used in the present specification can be interchangeably used.

(Names of Parameters and Channels)

The information, the parameters, and the like described in the present specification may be expressed by absolute values, by values relative to predetermined values, or by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

(Base Station)

The base station (radio base station) can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head (RRH)). The term "cell" or "sector" denotes part or all of the coverage area of the base station and/or of the base station subsystem that perform the communication service in the coverage. Furthermore, the terms "base station," "eNB," "cell," and "sector" can be interchangeably used in the present specification. The base station may be called a fixed station, a NodeB, an eNodeB (eNB), an access point, a femto cell, a small cell, or the like.

(Terminal)

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

Meaning and Interpretation of Terms

As used herein, the term "determining" may encompass a wide variety of actions. For example, "determining" may be regarded as judging, calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing and the like. That is, "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

The reference signal can also be abbreviated as RS and may also be called a pilot depending on the applied standard. The correction RS may be called a TRS (Tracking RS), a PC-RS (Phase Compensation RS), a PTRS (Phase Tracking RS), or an additional RS. The demodulation RS and the correction RS may be called by other corresponding names, respectively. The demodulation RS and the correction RS may be specified by the same name (for example, demodulation RS).

The description "based on" used in the present specification does not mean "based only on," unless otherwise specifically stated. In other words, the description "based on" means both of "based only on" and "based at least on."

The "section" in the configuration of each apparatus may be replaced with "means," "circuit," "device," or the like.

The terms "including," "comprising," and modifications of these terms are intended to be inclusive just like the term "having," as long as the terms are used in the present specification or the appended claims. Furthermore, the term "or" used in the present specification or the appended claims is not intended to be an exclusive or.

The radio frame may be constituted by one frame or a plurality of frames in the time domain. The one frame or each of the plurality of frames may be called a subframe, a time unit, or the like in the time domain. The subframe may be further constituted by one slot or a plurality of slots in the time domain. The slot may be further constituted by one symbol or a plurality of symbols (OFDM (Orthogonal Frequency Division Multiplexing) symbol, SC-FDMA (Single Carrier-Frequency Division Multiple Access) symbol, or the like) in the time domain.

The radio frame, the subframe, the slot, and the symbol indicate time units in transmitting signals. The radio frame, the subframe, the slot, and the symbol may be called by other corresponding names.

For example, in the LTE system, the base station creates a schedule for assigning radio resources to each mobile station (such as frequency bandwidth that can be used by each mobile station and transmission power). The minimum time unit of scheduling may be called a TTI (Transmission Time Interval).

For example, one subframe, a plurality of continuous subframes, or one slot may be called a TTI.

The resource unit is a resource assignment unit in the time domain and the frequency domain, and the resource unit may include one subcarrier or a plurality of continuous subcarriers in the frequency domain. In addition, the resource unit may include one symbol or a plurality of symbols in the time domain, and may have a length of one slot, one subframe, or one TTI. One TTI and one subframe may be constituted by one resource unit or a plurality of resource units. The resource unit may be called a resource block (RB), a physical resource block (PRB: Physical RB), a PRB pair, an RB pair, a scheduling unit, a frequency unit, or a subband. The resource unit may be constituted by one RE or a plurality of REs. For example, one RE only has to be a resource smaller in unit size than the resource unit serving as a resource assignment unit (for example, one RE only has to be a minimum unit of resource), and the naming is not limited to RE.

The structure of the radio frame is illustrative only, and the number of subframes included in the radio frame, the number of slots included in the subframe, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

(Variations and the Like of Aspects)

The aspects and embodiments described in the present specification may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims. Therefore, the description of the present specification is intended for exemplary description and does not limit the present invention in any sense.

The present patent application claims the benefit of priority based on Japanese Patent Application No. 2017-019121 filed on Feb. 3, 2017, and the entire content of Japanese Patent Application No. 2017-019121 is hereby incorporated by reference.

INDUSTRIAL APPLICABILITY

An aspect of the present invention is useful for a mobile communication system.

REFERENCE SIGNS LIST 10, 30, 40, 50 Radio Base Station
101 Storage Section
102 Control Section
103 Preprocessing Section
104 Mapping Section
105 IFFT Section
106 Post-Processing Section
107 Transmission Section
108 Antenna
20 User Terminal
201 Storage Section
202 Control Section
203 Antenna
204 Reception Section
205 Preprocessing Section
206 FFT Section
207 Signal Detection Section
208 Post-Processing Section
301 Non-Transmission-Time Computing Section
401 Subcarrier-Spacing Computing Section
501 CP-Length Computing Section

The invention claimed is:

1. A terminal comprising:
a processor configured to determine a signal waveform of a symbol of a downlink signal; and
a receiver configured to receive the downlink signal,
wherein the processor is further configured to preprocess the received downlink signal based on the determined signal waveform, to perform FFT processing on the preprocessed signal, and to perform, based on the determined signal waveform, equalization processing on the signal subjected to the FFT processing,
wherein the signal waveform is selected from among a plurality of signal-waveform candidates whose symbol lengths differ from one signal-waveform candidate to another, and the signal waveform is mapped in a TTI while the symbol does not span beyond the TTI, and
wherein the processor determines the signal waveform of the symbol according to a signal-waveform switching pattern in which no signal-waveform switching takes place within the TTI, and indicates to perform processing based on the determined signal waveform.

2. A terminal comprising:
a processor configured to determine a signal waveform of a symbol of a downlink signal; and
a receiver configured to receive the downlink signal,
wherein the processor is further configured to preprocess the received downlink signal based on the determined signal waveform, to perform FFT processing on the preprocessed signal, and to perform, based on the determined signal waveform, equalization processing on the signal subjected to the FFT processing,
wherein the signal waveform is selected from among a plurality of signal-waveform candidates whose symbol lengths differ from one signal-waveform candidate to another, and the signal waveform is mapped in a TTI while the symbol does not span beyond the TTI, and
wherein the processor determines the signal waveform of the symbol according to a combination pattern of a plurality of the signal waveforms by which time during which the symbol is not mapped is made zero in the TTI, and indicates to perform processing based on the determined signal waveform.

3. A radio communication method comprising:
determining a signal waveform of a symbol of a downlink signal;
receiving the downlink signal;
preprocessing the received downlink signal based on the determined signal waveform;
performing FFT processing on the preprocessed signal;
performing, based on the determined signal waveform, equalization processing on the signal subjected to the FFT processing,
wherein the signal waveform is selected from among a plurality of signal-waveform candidates whose symbol lengths differ from one signal-waveform candidate to another, and the signal waveform is mapped in a TTI while the symbol does not span beyond the TTI;
determining the signal waveform of the symbol according to a signal-waveform switching pattern in which no signal-waveform switching takes place within the TTI; and
indicating to perform processing based on the determined signal waveform.

* * * * *